(12) United States Patent
Dorna et al.

(10) Patent No.: US 11,054,166 B2
(45) Date of Patent: Jul. 6, 2021

(54) ENVIRONMENTAL CONDITIONING SYSTEM AND METHOD FOR CONDITIONING ENVIRONMENT OF OCCUPIABLE REGION

(71) Applicant: Carrier Corporation, Palm Beach Gardens, FL (US)

(72) Inventors: Luke Dorna, Roswell, GA (US); Chris Pietrzykowski, Marietta, GA (US); Ke Xu, Marietta, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 92 days.

(21) Appl. No.: 16/465,799

(22) PCT Filed: Dec. 1, 2017

(86) PCT No.: PCT/US2017/064119
§ 371 (c)(1),
(2) Date: May 31, 2019

(87) PCT Pub. No.: WO2018/102635
PCT Pub. Date: Jun. 7, 2018

(65) Prior Publication Data
US 2019/0316801 A1 Oct. 17, 2019

Related U.S. Application Data

(60) Provisional application No. 62/428,729, filed on Dec. 1, 2016.

(51) Int. Cl.
*F24F 11/63* (2018.01)
*F24F 11/46* (2018.01)
*F24F 120/10* (2018.01)

(52) U.S. Cl.
CPC .............. *F24F 11/63* (2018.01); *F24F 11/46* (2018.01); *F24F 2120/10* (2018.01)

(58) Field of Classification Search
CPC ........ F24F 11/63; F24F 11/46; F24F 2120/10; G05B 15/02
See application file for complete search history.

(56) References Cited

U.S. PATENT DOCUMENTS 6,965,813 B2 11/2005 Granqvist et al.
7,529,646 B2 5/2009 Lin et al.
(Continued)

FOREIGN PATENT DOCUMENTS

| WO | 2014150895 A | 9/2014 |
|----|--------------|--------|
| WO | 2015134789 A1 | 9/2015 |
| WO | 2016094445 A1 | 6/2016 |

OTHER PUBLICATIONS

Search Report for PCT Application No. PCT/US2017/064119 dated May 8, 2018; 5 pages.
(Continued)

*Primary Examiner* — Ramesh B Patel
(74) *Attorney, Agent, or Firm* — Cantor Colburn LLP (57) ABSTRACT

An environmental conditioning system for conditioning the environment of an occupiable region includes environmental conditioning hardware and a controller. The controller includes an occupancy module configured to receive ingress data associated with occupants entering the occupiable region for each of a first plurality of ingress iterations of a first prescribed time period. The controller further performs a first ingress rolling mean of the ingress data over the first plurality of ingress iterations, and compares at least the first ingress rolling mean to a first occupancy threshold. If the first occupancy threshold is exceeded by the first ingress (Continued)

rolling mean, the controller outputs a start command to the environmental conditioning hardware.

20 Claims, 3 Drawing Sheets

(56) References Cited

U.S. PATENT DOCUMENTS

| | | | |
|---|---|---|---|
| 7,734,572 B2 | 6/2010 | Wiemeyer et al. | |
| 9,176,485 B2* | 11/2015 | Krumm | G06N 7/005 |
| 9,189,527 B2 | 11/2015 | Park et al. | |
| 9,791,872 B2* | 10/2017 | Wang | G05D 23/1927 |
| 2005/0270151 A1 | 12/2005 | Winick | |
| 2007/0094716 A1 | 4/2007 | Farino et al. | |
| 2008/0277486 A1 | 11/2008 | Seem et al. | |
| 2010/0324962 A1 | 12/2010 | Nesler et al. | |
| 2011/0133884 A1 | 6/2011 | Kumar et al. | |
| 2011/0251725 A1 | 10/2011 | Chan | |
| 2012/0290137 A1 | 11/2012 | Raestik et al. | |
| 2012/0310376 A1* | 12/2012 | Krumm | G05B 15/02 700/31 |
| 2013/0085609 A1 | 4/2013 | Barker | |
| 2014/0163703 A1* | 6/2014 | Chang | G08B 13/1961 700/90 |
| 2014/0244047 A1 | 8/2014 | Oh et al. | |
| 2015/0358359 A1 | 12/2015 | Ghai et al. | |
| 2015/0362909 A1* | 12/2015 | McReynolds | G06Q 50/10 700/275 |
| 2016/0258642 A1* | 9/2016 | Cheatham, III | G05B 15/02 |
| 2017/0053068 A1* | 2/2017 | Pillai | G16H 40/63 |
| 2017/0171941 A1* | 6/2017 | Steiner | H05B 47/11 |
| 2019/0145648 A1* | 5/2019 | Sinha | G05D 23/1917 219/482 |
| 2020/0135028 A1* | 4/2020 | Bakhishev | G06K 9/00771 |

OTHER PUBLICATIONS

Written Opinion for PCT Application No. PCT/US2017/064119 dated May 8, 2018; 8 pages.

Dalton-Noblitt, A. "What is a fully integrated security system? The right security at every level", Allegion, Sep. 2012, 2 Pages.

Holst, J. "Intelligent HVAC installations, use of sensors and advantages of Continuous Commissioning", Technological Advances for Controlling Indoor Environment, Copenhagen, Oct. 24-25, 2005, 23 Pages.

* cited by examiner

ENVIRONMENTAL CONDITIONING SYSTEM AND METHOD FOR CONDITIONING ENVIRONMENT OF OCCUPIABLE REGION

CROSS-REFERENCE TO RELATED APPLICATIONS

This application claims the benefit of PCT/US2017/064119 filed Dec. 1, 2017, which claims priority to U.S. Provisional Application No. 62/428,729 filed Dec. 1, 2016, which is incorporated herein by reference in its entirety.

BACKGROUND

Exemplary embodiments pertain to the art of building management systems and more particularly to environmental control systems utilizing occupancy data.

Known building management systems of a building may perform multiple tasks or functions including that related to security, safety, environmental conditioning, and others. Environmental conditioning systems such as heating, ventilation, and air conditioning (HVAC) systems maintain high standards of service by keeping the environment in a building within the comfort zone of occupants. While it is desirable to maintain such high standards, the environmental conditioning systems utilize considerable energy at a substantial cost. To reduce environmental conditioning costs, computer-based controllers of the building management system, or dedicated controllers of the environmental conditioning systems may be preprogrammed to generally start up and shut down at prescribed times based on expected occupancy (e.g., working hours in a building that conducts business). The predicted occupancy data is traditionally, manually, inputted into the controller by, for example, building management personnel. Further improvements in predicting occupancy are desirable.

BRIEF DESCRIPTION

An environmental conditioning system for conditioning an environment of an occupiable region, in accordance with one, non-limiting, embodiment of the present disclosure includes environmental conditioning hardware constructed and arranged to condition the environment; and a controller including an occupancy module configured to receive ingress data associated with occupants entering the occupiable region for each of a first plurality of ingress iterations of a first prescribed time period, perform a first ingress rolling mean of the ingress data over the first plurality of ingress iterations, compare at least the first ingress rolling mean to a first occupancy threshold, and output a start command to the environmental conditioning hardware when the first occupancy threshold is exceeded by the first ingress rolling mean.

Additionally to the foregoing embodiment, the first plurality of ingress iterations is a plurality of a specific day of a week.

In the alternative or additionally thereto, in the foregoing embodiment, the ingress data is in-part associated with occupants entering the occupiable region for each of a second plurality of ingress iterations of a second prescribed time period, and the occupancy module is configured to perform a second ingress rolling mean, compare the second ingress rolling mean to a second occupancy threshold, and output the start command to the environmental conditioning hardware when the second occupancy threshold is exceeded by the second ingress rolling mean.

In the alternative or additionally thereto, in the foregoing embodiment, the first prescribed time period is one day of the week, and the second prescribed time period is another day of the week.

In the alternative or additionally thereto, in the foregoing embodiment, the first and second occupancy thresholds are the same.

In the alternative or additionally thereto, in the foregoing embodiment, the first and second plurality of iterations are each associated with a prescribed number of days.

In the alternative or additionally thereto, in the foregoing embodiment, the prescribed number of days is about five.

In the alternative or additionally thereto, in the foregoing embodiment, the controller includes a processor and a computer writeable and readable storage medium.

In the alternative or additionally thereto, in the foregoing embodiment, the controller includes a vacancy module configured to compare received egress data associated with occupants exiting the occupiable region for each of a first plurality of egress iterations of the first prescribed time period, perform a first egress rolling mean of the egress data over the first plurality of egress iterations, compare the first egress rolling mean to a first vacancy threshold, and output a shutdown command to the environmental conditioning hardware when the first vacancy threshold is exceeded by the first egress rolling mean.

In the alternative or additionally thereto, in the foregoing embodiment, first prescribed time period includes a plurality of time intervals and the first ingress rolling mean and the first egress rolling mean are each distributions over the plurality of time intervals.

In the alternative or additionally thereto, in the foregoing embodiment, the first egress distribution is subtracted from the first ingress distribution to establish a tabulation distribution that is compared to the first ingress and vacancy thresholds.

In the alternative or additionally thereto, in the foregoing embodiment, the controller is configured to compare the plurality of first egress iterations and the plurality of first ingress iterations to a deviation threshold and disregard the ingress and egress data for a particular time period that exceeds the deviation threshold.

In the alternative or additionally thereto, in the foregoing embodiment, the ingress data is generated by a sensing device.

In the alternative or additionally thereto, in the foregoing embodiment, at least one of the ingress and egress data are generated by a badge reader.

A method of operating an environmental condition system according to another, non-limiting, embodiment includes receiving ingress and egress data; dividing the ingress and egress data into a plurality of ingress and egress data segments each associated with a respective one of a plurality of time periods; dividing each of the plurality of time periods into a plurality of time intervals; dividing each of the ingress and egress data segments into a plurality of respective ingress and egress data sub-segments such that each of the plurality of ingress and egress data sub-segments is associated with a respective one of the plurality of time intervals; subtracting each of an egress data sub-segment of the plurality egress data sub-segments from a respective one of the plurality of ingress data sub-segments to formulate a tabulation distribution; comparing the tabulation distribution to occupancy and vacancy thresholds; starting environmental conditioning hardware if the occupancy threshold is exceeded; and shutting down environmental conditioning hardware if the vacancy threshold is exceeded.

Additionally to the foregoing embodiment, performing a plurality of iterations to establish a plurality of tabulation distributions over successive time periods for each one of the plurality of time periods; and performing a rolling median of the plurality of tabulation distributions for each one of the plurality of time periods to establish a predicted tabulation distribution before comparing to the occupancy and vacancy thresholds.

In the alternative or additionally thereto, in the foregoing embodiment the method includes establishing a total average tabulation distribution by averaging the plurality of tabulation distributions for all of the plurality of time periods; and monitoring for a deviated tabulation distribution by comparing the total average tabulation distribution to each one of the plurality of tabulation distributions for each successive time period.

In the alternative or additionally thereto, in the foregoing embodiment the method includes disregarding the deviated tabulation distribution for a specific time period of the plurality of time periods when performing the rolling median for that specific time period.

In the alternative or additionally thereto, in the foregoing embodiment, the deviated tabulation distribution is deviated by about two standard deviations from the total average tabulation distribution.

In the alternative or additionally thereto, in the foregoing embodiment the method includes notifying a user concerning the deviated tabulation distribution.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
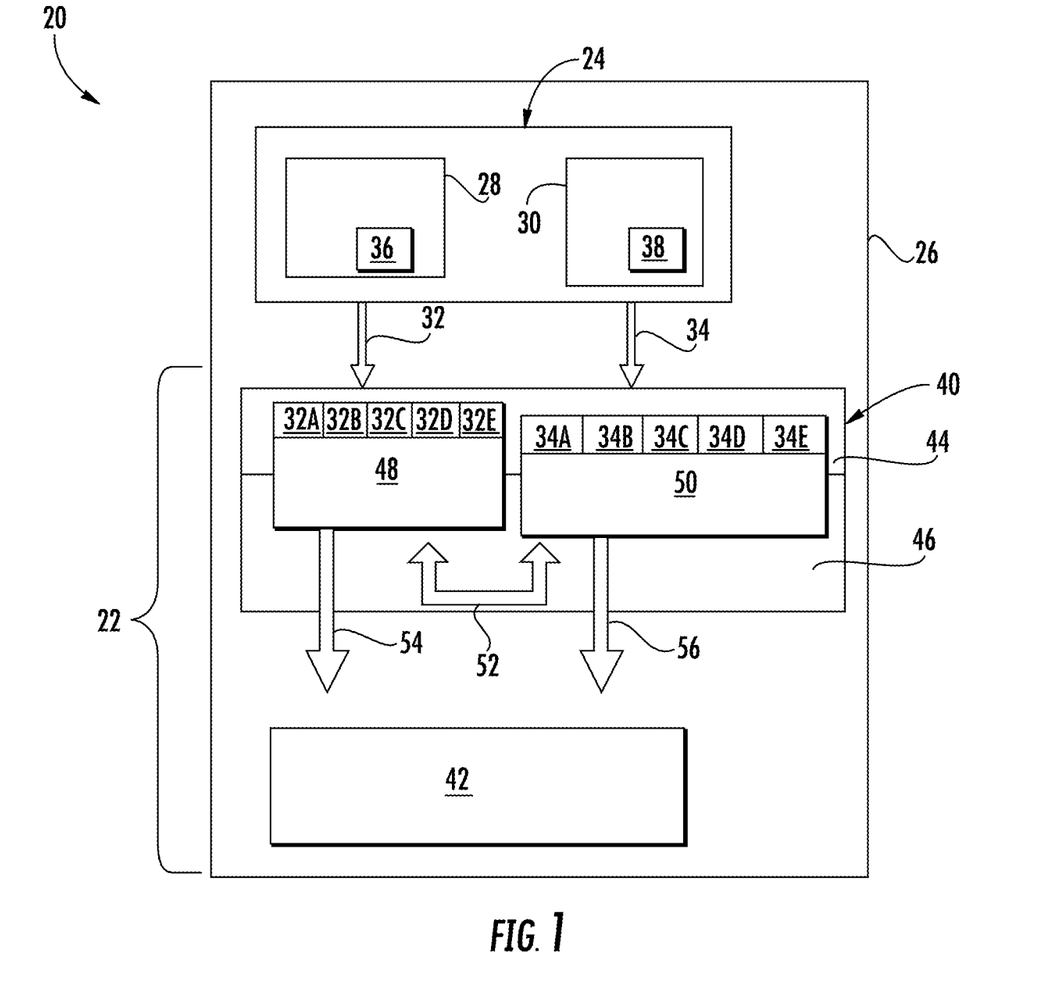
FIG. 1 is a schematic of a building management system including an environmental conditioning system as one exemplary embodiment.

Referring to FIG. 1, a building management system 20 may be constructed and arranged to handle a host of building functions and/or attributes including that related to environmental conditioning, security, safety, fire protection, occupancy detection or monitoring, various combination thereof, and other functions. Environmental conditioning may be handled, at least in-part, by an environmental conditioning system 22 that may expend energy to control factors such as heating, cooling, humidity, lighting and other factors. Other aspects of the building management system 20 may include an occupancy monitoring system 24 that may be configured to at least monitor the number of occupants (e.g., people, livestock, pets, etc.) entering and/or leaving a building or region 26. The occupancy monitoring system 24 may be part of any variety of subsystems of the building management system 20 including, for example, part of a security system. Alternatively, the occupancy monitoring system 24 may be a dedicated part of the environmental conditioning system 22. It is further contemplated and understood that the region 26 may be an entire building, a floor of the building, and/or specific areas of the building or floor.

The occupancy monitoring system 24 may include an ingress event module 28 and an egress event module 30. The ingress and egress event modules 28, 30 are configured to respectively send ingress and egress data (see arrows 32, 34) to the environmental conditioning system 22. Together, the ingress and egress data may be termed 'occupancy data.' The ingress and egress modules may include respective ingress and egress sensing devices 36, 38. In one embodiment, one or both of the sensing devices 36, 38 may be, for example, security card or badge readers configured to read and identify security cards (or badges) worn by occupants entering and exiting the building 26. In another embodiment, the sensing device 36 and/or the sensing device 38 may be an electrical contact mounted to a door, and configured to send a door actuation signal indicative of one or more occupants leaving the building 26. It is further contemplated and understood that the sensing devices may be associated with any technology that applies an 'access granted' method including biometric scanners and mobile device commands.

Each event module 28, 30 may further include a controller, or a common controller, as part of the occupancy monitoring system 24 that may be, or may be part of, a security system. The controller(s) may be configured to receive the signals outputted by the sensing devices 36, 38, process the signals, and output the ingress and egress data 32, 34 to the environmental conditioning system 22. In another embodiment, the controller(s) may process the signals from the sensing devices 36, 38 and output a signal indicative of combined ingress/egress data. For example, in any given time period, the combined ingress/egress data signal may indicate an increase in occupancy, but only after taking into account occupants who have left the building 26 during the same time period. In yet another embodiment, the sensing devices 36, 38 may send ingress and egress signals directly to the environmental conditioning system 22. That is, the ingress and egress signals may generally be the respective ingress and egress data 32, 34.

The environmental conditioning system 22 may include a controller 40 and environmental conditioning hardware 42 that may generally be started, monitored, stopped, and otherwise controlled by the controller 40. The environmental conditioning hardware 42 may include hardware components, known to one having skill in the art, for the heating, cooling, control of humidity, lighting, and/or control of other factors pertaining to the environment. The controller 40 may be an integral part of a controller of the building management system 20, or may be a dedicated controller of the environmental conditioning system 22. The controller 40 may include a processor 44 (e.g., microprocessor), a computer writeable and readable storage medium 46, an occupancy module 48, and a vacancy module 50. The occupancy module 48 may be configured to receive the ingress data 32, and the vacancy module may be configured to receive the egress data 34 from the occupancy monitoring system 24.

The controller 40 of the environmental conditioning system 22 is generally configured to utilize past recorded occupancy data to predict future occupancy over a given, prescribed, time period. For example, the time period may be a twenty four hour period associated with a Monday. Utilizing a prescribed occupancy threshold and occupancy data recorded over a plurality of past Mondays (i.e., a plurality of a specific day of a week), the system 22 is capable of predicting occupancy (i.e., an occupancy distribution over the 24 hour period) for the next Monday. In one example, the system 22 may determine that occupancy will exceed the occupancy threshold at 8:00 AM for the upcoming Monday. The controller 40 may then start the environmental conditioning hardware 42 to, for example, heat the building 26. A similar process, utilizing a vacancy threshold, may be utilized to shut down the hardware 42 after a majority of occupants have left the building 26.

More specifically, the modules 48, 50 may, at least in-part, be software-based or computer programs including a variety of user defined thresholds and may further include a variety of override commands that may be stored in the storage medium 46 and executed by the processor 44 of the controller 40. In one embodiment, the occupancy and vacancy modules 48, 50 may be programmed to receive the respective ingress and egress data 32, 34 continuously (i.e., 24 hours a day, 7 days a week). In another embodiment, the occupancy and vacancy modules 48, 50 may be programmed to receive the ingress and egress data 32, 34 during work days (i.e., Monday through Friday). Both modules may be configured to divide the ingress and egress data 32, 34 into, for example, 24 hour segments. More specifically, and in the example of a five day work week associated with a business building 26, the ingress data 32 may be divided into five ingress data segments 32A, 32B, 32C, 32D, 32E, respectively associated with Monday, Tuesday, Wednesday, Thursday, and Friday. Similarly, the egress data 34 may be divided into egress data segments 34A, 34B, 34C, 34D, 34E.

In one embodiment and like Monday through Fridays, known holidays may also be grouped as a separate type of day. For example, with the controller 40 properly configured, the algorithm may review the previous five holidays to predict the next holiday occupancy conditions. If the holiday is not properly marked, or configured in the controller 40, the algorithm may see the holiday as a typical weekday type. In this instance, the holiday may be identified as an unacceptable deviation and will not be used to calculate means or rolling means for the typical workday type.

For simplicity of explanation, operation of the controller 40 of the environmental conditioning system 22 will be described with reference to the example of 'Mondays' associated with ingress and egress data segments 32A, 32B. With this stated, it is understood that the same principals will apply to, for example, Tuesdays, Wednesdays, Thursdays, and Fridays. Each ingress and egress data segment 32A, 34A amounts to that data taken during a prescribed time period, which in this example, amounts to the twenty four (24) hours of a Monday. For each Monday, both the occupancy and vacancy modules 48, 50 may perform a rolling mean of the respective ingress data segment 32A and the egress data segment 34A for any given moment in time within the prescribed time period. That is, the occupancy and vacancy modules 48, 50 may compute a rolling mean at a plurality of prescribed time intervals (e.g., every one minute) within the twenty four hour time frame of the prescribed time period. The modules 48, 50 may thereby form occupancy and vacancy distributions in view of time during the entire prescribed time period. It is further contemplated and understood that the controller 40 may be configured to apply a count reset method that resets occupancy to zero (i.e., zero-out) occupancy at a user defined time to reduce propagating errors due to piggy-backing forward.

Figure 2:
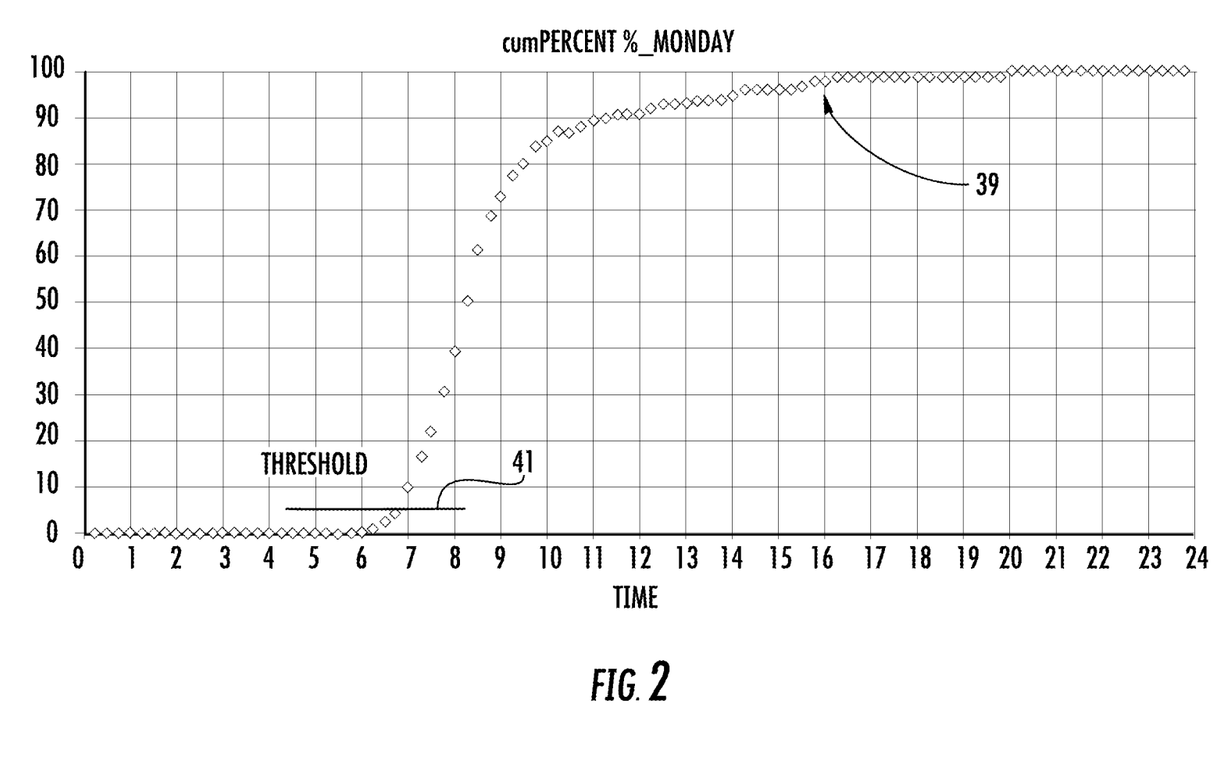
FIG. 2 is a normalized graph is a rolling mean distribution for a particular day type.

The term "rolling mean" as used herein, may include a rolling median (i.e., a normalized rolling median) or a rolling average. Referring to FIG. 2 and in the example of a rolling median, the table lists about 288 date points or elements corresponding to each predetermined, five minute, intervals for a 24 hour period. To assemble the table illustrated in FIG. 3, the controller 40 may calculate the number of occupants entering at each time stamp (i.e., the plurality of prescribed time intervals) for the past five Mondays (as one example). This assumes that no abnormal occupancy is detected. More specifically and in one example, at 8:05 am, there may be five data points (e.g., 5, 7, 6, 1, 0), meaning there are 5, 7, 6, 1, and 0 occupants that entered the building between 8:00 am and 8:05 am in the past, respective, five Mondays. The rolling median in this data set is selected by the controller 40 as five (5). The controller 40 then repeats this process for all 288 time stamps, and normalizes the data representative of the total number of occupants for the example of a Monday to assemble the distribution 39 illustrated in FIG. 2. It is contemplated and understood that a similar process may be performed using the rolling average. The value of the rolling average for the example outlined above would be 3.8.

The occupancy and vacancy modules 48, 50 may generally communicate with one-another (see arrow 52 in FIG. 1) to generally subtract egress data segment 34A, associated with occupants entering the building 26, from the ingress data segment 32A, associated with occupants exiting the building 26, for each moment in time (e.g., a time interval of one minute) throughout the prescribed time period (e.g., 24 hours). The resulting tabulation distribution may then generally reflect the total occupancy within the building for any given moment in time throughout the prescribed time period.

The tabulated distribution for a particular Monday may be stored in the memory 46 of the controller 40. The controller 40 may then continue this process for a plurality of Mondays; and likewise, for a plurality of Tuesdays, Wednesdays, Thursdays, and Fridays. In one embodiment, the controller 40 may be configured to establish trends and look for deviations that may be, for example, representative of a holiday, whereby the building 26 is substantially not occupied on a particular weekday.

For example, and describing the scenario for Mondays, the controller 40 may be configured to evaluate the plurality of Monday tabulated distributions for unacceptable deviations. When searching for Monday deviations, the controller 40 may first calculate a total, average, tabulated distribution that, in one example, may include five (5) weeks of ingress and egress data 32, 34. More specifically, the plurality of prescribed time periods associated for Monday may be the past five (5) Mondays, and the plurality of prescribed time periods for Tuesday may be the past five (5) Tuesdays, and so on. In the present example, the total, average, tabulated distribution may be the average of twenty-five tabulated distributions (i.e., five for each day of the week over a five week period). With the total, average, tabulated distribution established, the distribution may be compared to each of the five Monday tabulated distributions. If any one of the five tabulated distributions for Monday are, for example, calculated to be outside of a deviation (e.g., about two standard deviations) from the total, average, tabulated distribution, that Monday tabulated distribution may be disregarded by the controller 40.

In a continuation of the Monday example, if one of the tabulated distributions is calculated to be deviated in excess of two standard deviations, the controller 40 may average the past four Monday tabulated distributions not deviated to achieve/calculate a predicted tabulated distribution for the upcoming/future Monday. If none of the five Monday tabulated distributions are deviated, the controller 40 may average the past five Monday tabulated distributions to achieve/calculate the predicted tabulated distribution for the upcoming/future Monday. It is contemplated and understood that the two standard deviation limit may be applied to each time interval within each tabulated distribution, and only that time interval found to be outside of the two standard deviation limit may be disregarded while the remaining data of the distribution may be used to calculate the predicted tabulated distribution. Moreover, days with abnormal occupancy may be identified by assembling a list of daily total numbers of occupants for peer weekdays/weekends. For example, a Monday with 5 or 500 occupants may be identified as abnormal in a data listing consisting of about 25 peer weekday occupancy data like: 100, 115, 120, 110, 125, 116 ... 5, 125, 500. Occupancy data for the entire, abnormal, day may not be used to predict the next normal weekday.

Preprogrammed (i.e., user defined) within the memory 46 may be an occupancy or start threshold 41 (see FIG. 2) indicative of occupants entering the building 26, and a vacancy or shut-down threshold indicative of occupants exiting the building. The controller 40 may be configured to compare the occupancy threshold 41 to the predicted tabulated distribution for Monday and thereby determine the time at which the building occupancy should exceed the occupancy threshold. At this time, the controller 40 may output a start command (see arrow 54 in FIG. 1) to the environmental conditioning hardware 42. In another embodiment, the controller 40 may output an occupancy signal to the hardware 42. The actual start signal may be calculated by other algorithms based on this occupancy signal. The controller 40 is further configured to compare the vacancy threshold to the predicted tabulated distribution for Monday and thereby determine the time at which the building occupancy should drop below the vacancy threshold. At this time, the controller 40 may output a shutdown command (e.g., see arrow 56 in FIG. 1) to the environmental conditioning hardware 42.

Figure 3:
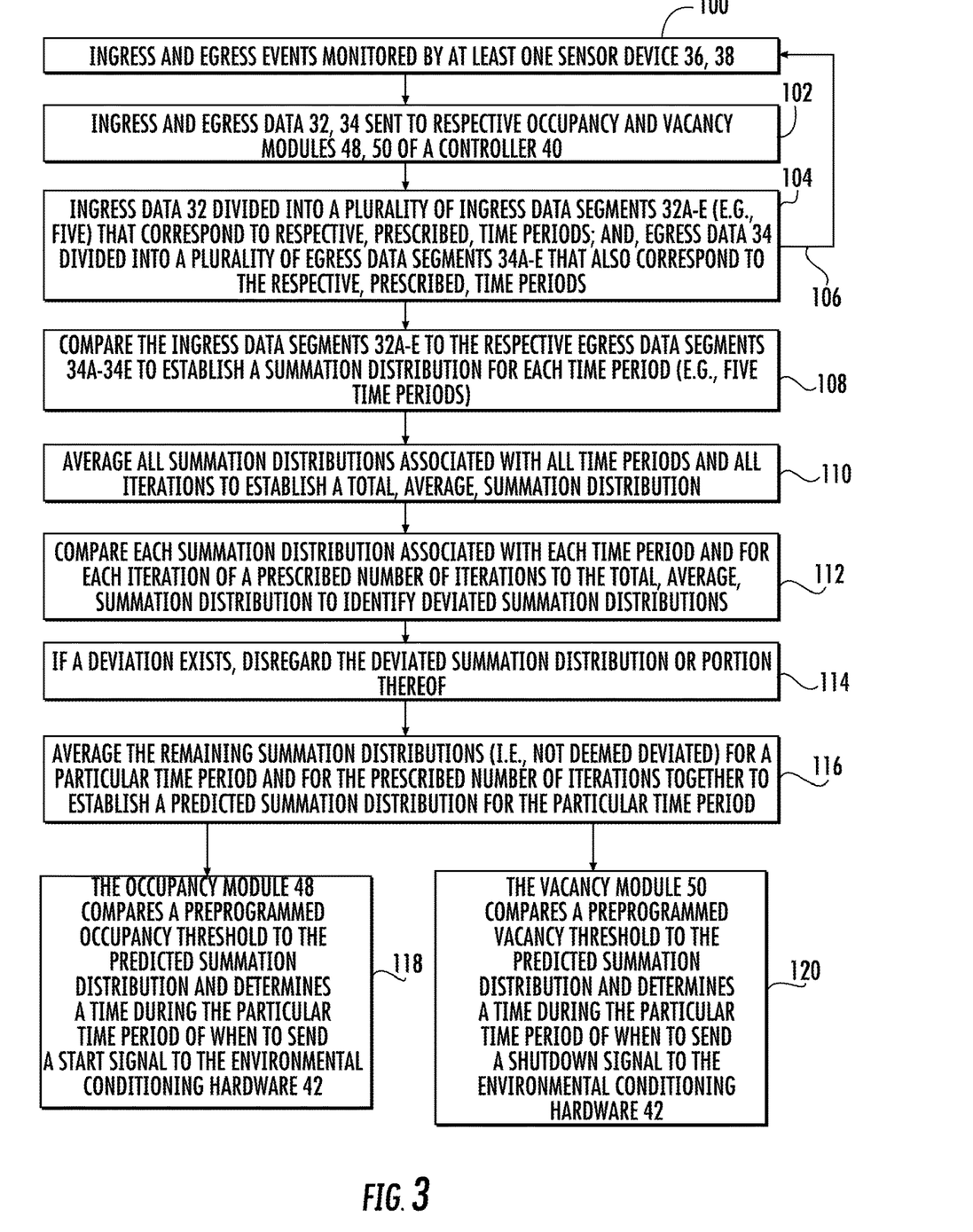
FIG. 3 is a flowchart of a method of operating the environmental conditioning system.

Referring to FIG. 3, a method of operating an environmental conditioning system 22 is illustrated. At block 100, ingress and egress events may be monitored by at least one sensor device 36, 38. At block 102, ingress and egress data 32, 34 may be sent to respective occupancy and vacancy modules 48, 50 of the controller 40. At block 104, the occupancy module 48 may divide the ingress data 32 into a plurality of ingress data segments 32A, 32B, 32C, 32D, 32E (e.g., five segments for five respective days) that correspond to respective, prescribed, time periods; and, the vacancy module 50 may divide the egress data 34 into a plurality of egress data segments 34A, 34B, 34C, 34D, 34E that correspond to the respective, prescribed, time periods. The data segments 32A-E, 34A-E for respective time periods are then stored in a memory of the controller 40 and the process repeats itself (see arrow 106) for a plurality of prescribed iterations. It is contemplated and understood that the system may operate throughout the seven days of the week as oppose to the five working days described. Likewise, the system would reverse the holiday calculator that discards data with low occupancy one weekdays to discard high occupancy on weekends, to keep from propagating a one-off weekend event (e.g., overtime work week to complete a big business proposal).

At block 108, the controller 40 compares the ingress data segments 32A-E to the respective egress data segments 34A-34E to establish a tabulated distribution for each time period (e.g., five time periods). More specifically, and for the example of a Monday time period 32A, the time period 32A is divided into a plurality of prescribed time intervals (e.g., 288 time intervals for an interval duration of five minutes and a time period of 24 hours), and the ingress and egress data segments 32A, 34A are, likewise, subdivided. The subdivided egress data segments are then subtracted from the respective subdivided ingress data segments to achieve the tabulated distribution extending over the 24 hour period. At block 110, all tabulated distributions associated with all time periods and all iterations are averaged to establish a total, average, tabulated distribution. At block 112, each tabulated distribution associated with each time period and for each iteration of a prescribed number of iterations is compared to the total, average, tabulated distribution to identify deviated tabulated distributions. At block 114, the deviated tabulated distribution, or deviated portion thereof, is disregarded for rolling means. However; the controller 40 may be configured to output a notification signal/message to a user. The message may be suggestive of an observed holiday or other occurrence.

At block 116, the remaining tabulated distributions (i.e., not deemed deviated) for a particular time period and for the prescribed number of iterations are averaged together to establish a predicted tabulated distribution for that particular time period. At block 118, the occupancy module 48 of the controller 40 compares a preprogrammed occupancy threshold to the predicted tabulated distribution and determines a time during the particular time period of when to send a start signal to the environmental conditioning hardware 42. At block 120, the vacancy module 50 of the controller 40 compares a preprogrammed vacancy threshold to the predicted tabulated distribution and determines a time during the particular time period of when to send a shutdown signal to the environmental conditioning hardware 42.

The present disclosure may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Benefits and advantages of the present disclosure include a method that automatically creates tailored, dynamic, energy efficient, HVAC and occupancy schedules associated with any number of thermal zones. Other advantages include a reduction in energy cost.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental conditioning system for conditioning an environment of an occupiable region and configured to communicate with ingress and egress sensing devices, the environmental conditioning system comprising:

environmental conditioning hardware constructed and arranged to condition the environment; and a controller including an occupancy module configured to receive ingress data from the ingress sensing device associated with occupants entering the occupiable region for each of a first plurality of ingress iterations of a first prescribed time period, perform a first ingress rolling mean of the ingress data over the first plurality of ingress iterations, compare at least the first ingress rolling mean to a first occupancy threshold, and output a start command to the environmental conditioning hardware when the first occupancy threshold is exceeded by the first ingress rolling mean.

2. The environmental conditioning system set forth in claim 1, wherein the first plurality of ingress iterations is a plurality of a specific day of a week.

3. The environmental conditioning system set forth in claim 1, wherein the ingress data is in-part associated with occupants entering the occupiable region for each of a second plurality of ingress iterations of a second prescribed time period, and the occupancy module is configured to perform a second ingress rolling mean, compare the second ingress rolling mean to a second occupancy threshold, and output the start command to the environmental conditioning hardware when the second occupancy threshold is exceeded by the second ingress rolling mean.

4. The environmental conditioning system set forth in claim 3, wherein the first prescribed time period is one day of the week, and the second prescribed time period is another day of the week.

5. The environmental conditioning system set forth in claim 3, wherein the first and second occupancy thresholds are the same.

6. The environmental conditioning system set forth in claim 3, wherein the first and second plurality of iterations are each associated with a prescribed number of days.

7. The environmental conditioning system set forth in claim 6, wherein the prescribed number of days is about five.

8. The environmental condition system set forth in claim 1, wherein the controller includes a processor and a computer writeable and readable storage medium.

9. The environmental conditioning system set forth in claim 1, wherein the controller includes a vacancy module configured to compare received egress data from the egress sensing device and associated with occupants exiting the occupiable region for each of a first plurality of egress iterations of the first prescribed time period, perform a first egress rolling mean of the egress data over the first plurality of egress iterations, compare the first egress rolling mean to a first vacancy threshold, and output a shutdown command to the environmental conditioning hardware when the first vacancy threshold is exceeded by the first egress rolling mean.

10. The environmental conditioning system set forth in claim 9, wherein first prescribed time period includes a plurality of time intervals and the first ingress rolling mean and the first egress rolling mean are each distributions over the plurality of time intervals.

11. The environmental conditioning system set forth in claim 10, wherein the first egress distribution is subtracted from the first ingress distribution to establish a tabulation distribution that is compared to the first ingress and vacancy thresholds.

12. The environmental conditioning system set forth in claim 9, wherein the controller is configured to compare the plurality of first egress iterations and the plurality of first ingress iterations to a deviation threshold and disregard the ingress and egress data for a particular time period that exceeds the deviation threshold.

13. The environmental conditioning system set forth in claim 9, wherein at least one of the ingress and egress data are generated by a badge reader.

14. The environmental conditioning system set forth in claim 1, wherein the ingress data is generated by a sensing device.

15. The environmental conditioning system set forth in claim 1, wherein the occupancy module is configured to receive ingress data associated with occupants entering the occupiable region for each of a shifted forward first plurality of ingress iterations of a shifted forward first prescribed time period, perform a shifted forward first ingress rolling mean of the ingress data over the shifted forward first plurality of ingress iterations, compare at least the shifted forward first ingress rolling mean to the first occupancy threshold, and output a start command to the environmental conditioning hardware when the first occupancy threshold is exceeded by the shifted forward first ingress rolling mean, wherein the first prescribed time period overlaps the shifted forward first prescribed time period, wherein the shifted forward first plurality of ingress iterations includes at least one of the iterations of the first plurality of ingress iterations, and wherein the first plurality of ingress iterations includes at least one of the iterations of the shifted forward first plurality of ingress iterations.

16. A method of operating an environmental condition system comprising:
receiving ingress and egress data from respective ingress and egress sensing devices;
dividing the ingress and egress data into a plurality of ingress and egress data segments each associated with a respective one of a plurality of time periods;
dividing each of the plurality of time periods into a plurality of time intervals;
dividing each of the ingress and egress data segments into a plurality of respective ingress and egress data sub-segments such that each of the plurality of ingress and egress data sub-segments is associated with a respective one of the plurality of time intervals;
subtracting each of an egress data sub-segment of the plurality egress data sub-segments from a respective one of the plurality of ingress data sub-segments to formulate a tabulation distribution;
comparing the tabulation distribution to occupancy and vacancy thresholds;
starting environmental conditioning hardware if the occupancy threshold is exceeded;
shutting down environmental conditioning hardware if the vacancy threshold is exceeded;
performing a plurality of iterations to establish a plurality of tabulation distributions over successive time periods for each one of the plurality of time periods; and
performing a rolling medium of the plurality of tabulation distributions for each one of the plurality of time periods to establish a predicted tabulation distribution before comparing to the occupancy and vacancy thresholds.

17. The method set forth in claim 16 further comprising:
establishing a total average tabulation distribution by averaging the plurality of tabulation distributions for all of the plurality of time periods; and
monitoring for a deviated tabulation distribution by comparing the total average tabulation distribution to each one of the plurality of tabulation distributions for each successive time period.

18. The method set forth in claim 17 further comprising:
disregarding the deviated tabulation distribution for a specific time period of the plurality of time periods when performing the rolling medium for that specific time period.

19. The method set forth in claim 17, wherein the deviated tabulation distribution is deviated by about two standard deviations from the total average tabulation distribution.

20. The method set forth in claim 18 further comprising: notifying a user concerning the deviated tabulation distribution.

\* \* \* \* \*